UNITED STATES PATENT OFFICE.

JOHN B. WALLACE AND JOHN W. STEMM, OF GALION, OHIO, ASSIGNORS OF ONE-HALF TO CHARLES A. ALLEN AND ARTHUR W. BALL, OF SAME PLACE.

ANTIFRICTION LUBRICATING COMPOUND.

SPECIFICATION forming part of Letters Patent No. 487,203, dated November 29, 1892.

Application filed June 29, 1892. Serial No. 438,427. (No specimens.)

*To all whom it may concern:*

Be it known that we, JOHN B. WALLACE and JOHN W. STEMM, both residents of Galion, in the county of Crawford and State of Ohio, have invented certain new and useful Improvements in Antifriction Lubricating Compounds; and we do hereby declare that the following is a full, clear, and exact description of the invention, which will enable others skilled in the art to which it appertains to make and use the same.

Our invention relates to an improved compound or composition for shafts, journals, and other moving parts of machinery for the purpose of reducing friction and preventing heating.

The invention consists in a compound or composition composed of slaked lime, calcined magnesia, pulverized soapstone, (or French chalk,) chloride of lime, water, and oil, compounded in the manner and in the proportions substantially as hereinafter set forth.

In carrying our invention into effect we take thirty-two pounds of quicklime with sufficient water to slake the same and while slaking we add sixteen ounces of calcined magnesia, sixteen ounces of pulverized soapstone, (or French chalk,) and four ounces of chloride of lime and mix the same thoroughly. We then add thirty-two gallons of water, stir again, and allow the mass to settle, after which a sufficient quantity of any suitable lubricating-oil is added to give it the proper consistency.

The compound thus produced is applicable for use in connection with machinery of all kinds and is applied in any suitable manner, and by reason of the peculiar proportions of the several ingredients friction between the moving parts is greatly reduced and heating of the same prevented.

The functions of the chloride of lime are to prevent gumming of the compound and to destroy impurities in the water used.

Having thus described our invention, what we claim is—

The herein-described antifriction lubricating composition, consisting of slaked lime, calcined magnesia, pulverized soapstone, chloride of lime, water, and oil, compounded in the manner and in about the proportions substantially as specified.

In testimony that we claim the foregoing as our own we have hereunto affixed our signatures in presence of two witnesses.

JOHN B. WALLACE.
JOHN W. STEMM.

Witnesses:
J. W. COULTER,
A. M. METHEANY.